Patented Apr. 20, 1943

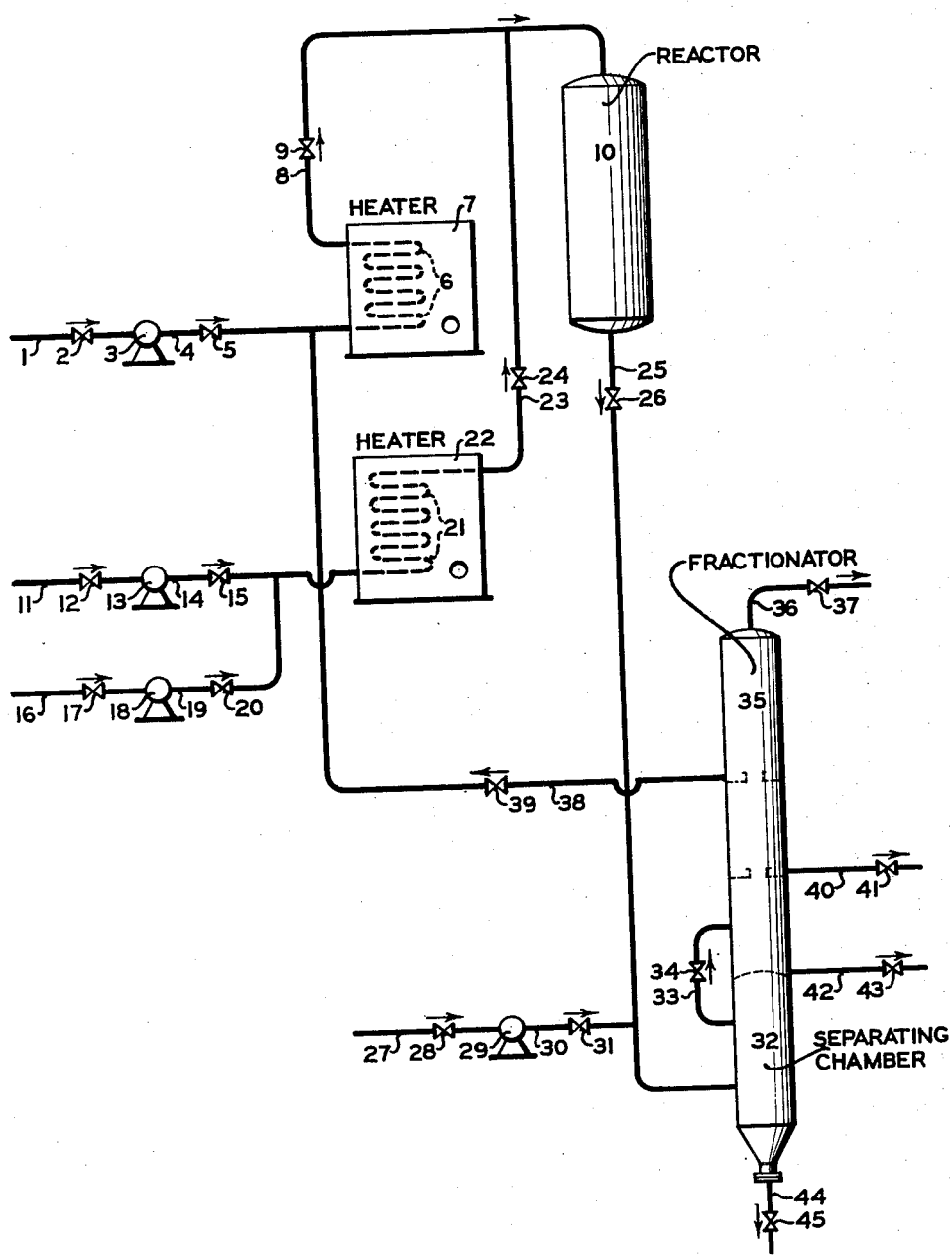

2,316,775

UNITED STATES PATENT OFFICE 2,316,775

TREATMENT OF HYDROCARBONS

Gustav Egloff, Chicago, Ill., assignor to Universal Oil Products Company, Chicago, Ill., a corporation of Delaware Application January 27, 1941, Serial No. 376,031

7 Claims. (Cl. 196—10)

This invention relates to a process for producing a substantially saturated gasoline of high antiknock value from substantially straight chain paraffin hydrocarbons and normally gaseous olefins. More specifically the invention is concerned with a combination process comprising isomerization of normal butane to isobutane and alkylation of said isobutane by gaseous olefins comprising ethylene, propene, and butenes, such olefins being constituents of gases formed incidental to oil cracking operations.

Butanes are produced in considerable quantities in the oil refining industry. They occur in substantial amounts in natural gases (in which the normal compound usually predominates), in refinery gases which are evolved from crude petroleum storage tanks and in the primary distillation of crudes, and they are also present in considerable percentages in the gases formed incidental to cracking heavy petroleum fractions for the production of gasoline. In the case of cracked gas mixtures the relative proportions of iso and normal butanes vary, but the ratio of the iso to the normal compound is as a rule considerably higher than in natural gas.

Butanes, at the present time, have a further important relationship to oil refining in that their excess production over that needed for imparting to gasoline a desired vapor pressure may be used as starting material for the production of gasoline by a method hereinafter described.

In one specific embodiment the present invention comprises a process for producing a substantially saturated gasoline of high antiknock value which comprises subjecting normal butane to contact with vaporized aluminum chloride at an isomerizing temperature below the sublimation temperature of aluminum chloride in the presence of hydrogen chloride to give a reaction product containing a substantial proportion of isobutane, subsequently and continuously injecting an olefin-containing hydrocarbon fraction into said reaction product to form a substantially saturated alkylation product, separating from said alkylation product an alkymer gasoline, a higher boiling fraction, unconverted normal butane, and hydrogen chloride, and recycling said unconverted normal butane to further isomerization treatment with said aluminum chloride.

Normal butane heated to an isomerizing temperature of from about 100° to about 350° F. at a pressure of from substantially atmospheric to approximately 1000 pounds per square inch is commingled with from about 0.5 to about 20% by weight of hydrogen chloride and up to about 10% by weight of vaporized aluminum chloride and the resulting commingled materials are subjected to contact for a time adequate to effect substantial formation of isobutane. To the isomerization products containing isobutane, hydrogen chloride, the aluminum chloride used in isomerization, and unconverted normal butane as well as minor amounts of products such as hydrogen, methane, ethane, and pentanes, is added an olefin-containing hydrocarbon fraction in an amount sufficient to alkylate a substantial proportion of the isobutane. In the reaction mixture being subjected to alkylation approximately 2 to 40 molecular proportions of isobutane are present for each molecular proportion of olefinic hydrocarbon added thereto in order to promote alkylation and to minimize olefin polymerization.

The isomerization of normal butane to isobutane and the subsequent alkylation of said isobutane by an olefin may, when desired, be carried out in the same reactor by introducing the olefin-containing fraction at an intermediate point or points in the reactor. Thus isomerization occurring in the first part of the reactor supplies isobutane which reacts with an olefin in a subsequent portion of the reactor to produce a substantially saturated hydrocarbon fraction containing a relatively high proportion of branched chain paraffins of high antiknock value.

The commingled mixture containing isobutane, aluminum chloride, and an olefin or olefin mixture, may also undergo alkylation in the lower part of a fractional distilling column employed for separating alkymer gasoline and higher boiling alkylation product from unconverted normal butane and hydrogen chloride as hereinafter set forth. Said unconverted normal butane may be recycled to commingle with the fresh normal butane being charged to the isomerizing step of the process.

The olefinic hydrocarbons employed for alkylating isobutane or other isoparaffins may be present in the 2-, 3- and 4-carbon atom hydrocarbon fractions produced incidental to the cracking of oil or they may be obtained from any other source such as by the dehydrogenation or pyrolysis of a normally gaseous paraffin. Normally liquid olefins are also utilizable for alkylating isoparaffins including isobutane.

The use of the combination process comprising the continuous isomerization of normal butane or of a higher paraffin followed by alkylation with an olefin according to this invention has the advantage that substantially saturated gasoline of high octane number is produced without the necessity of hydrogenation which is inherent in the formation of substantially saturated gasoline, which may be used for aviation purposes, by previously used processes involving dehydrogenation of butane, polymerization of the resultant butenes to iso-octenes, and hydrogenation of the iso-octenes to iso-octanes.

The process of this invention is also applicable to the isomerization of normal and branched chain liquid paraffins to branched and more-highly branched chain liquid paraffins which may be alkylated with normally gaseous and/or normally liquid olefins to produce a substantially saturated alkymer gasoline of high antiknock value.

For the purpose of illustrating the combination of steps characteristic of the present invention the accompanying drawing illustrates diagrammatically means embodying one specific arrangement of apparatus utilizable for producing gasoline of high octane number from normal butane and normally gaseous olefins comprising essentially ethylene, propene, and butenes.

Referring to the drawing, normal butane is introduced through line 1 and valve 2 to pump or compressor 3 which discharges through line 4 and valve 5 to coil 6 which receives heat from heater 7 and thence passes through line 8 and valve 9 to reactor 10. Simultaneously hydrogen chloride is introduced through line 11 and valve 12 to compressor 13 which discharges through line 14 and valve 15 and molten aluminum chloride is admitted under pressure through line 16 and valve 17 to pump 18 which discharges through line 19 and valve 20 into line 14, already mentioned. The commingled mixture of hydrogen chloride and molten aluminum chloride is passed through coil 21 which receives heat from heater 22 and is thereby brought to a temperature sufficient to vaporize said aluminum chloride. From coil 21 the vaporized aluminum chloride is directed through line 23 and valve 24 to line 8 through which normal butane at a temperature between about 100° and 350° F. is being conducted to the aforementioned reactor. When the butane stream meets the stream of aluminum chloride vapor, the resulting temperature is below the vaporization temperature of the aluminum chloride and at substantially the point desired for the isomerization reaction in the presence of finely divided solid aluminum chloride resulting from such condensation of vaporized aluminum chloride.

The mixture of normal butane, aluminum chloride, and hydrogen chloride, after being contacted in reactor 10 for a time sufficient to effect substantial formation of isobutane is continuously withdrawn therefrom through line 25 containing valve 26 and therein commingled with a fraction containing olefins such as ethylene, propene, and butenes introduced through line 27 and valve 28 to pump or compressor 29 which discharges through line 30 and valve 31 into line 25, already mentioned. Interaction of isobutane and olefins, which begins when these hydrocarbons are subjected to contact with aluminum chloride and hydrogen chloride in line 25, is substantially completed in reacting and separating chamber 32. Chamber 32 is connected by way of line 33 and pressure control valve 34 with fractionator 35 which, in the particular case here illustrated, comprises the upper portion of the same column in which chamber 32 is disposed. The alkylation products which thus form in line 25 and in chamber 32 are conducted through line 33 and pressure control valve 34 to fractionator 35 of conventional design adequate for separating a hydrogen chloride-containing fraction, unconverted normal butane, alkymer gasoline, and a relatively heavier alkylate. Said hydrogen chloride-containing fraction is discharged from fractionator 35 through line 36 and valve 37 to storage or to further use in the process as hereinabove set forth. Unconverted normal butane is directed from fractionator 35 through line 38 and valve 39 to line 4, already mentioned, through which normal butane is charged to the aforementioned heating and isomerizing treatments. Alkymer gasoline of high antiknock value is withdrawn from fractionator 35 through line 40 and valve 41 while a relatively heavier alkylate is discharged through line 42 and valve 43. Aluminum chloride-containing sludge or residue which is separated from lighter hydrocarbonaceous products in chamber 32 is withdrawn therefrom through line 44 and valve 45. When desired, a portion of said sludge being discharged through line 44 as well as the hydrogen chloride-containing fraction released through line 36 may be recycled, by means not shown, to commingle with the mixture of fresh aluminum chloride and hydrogen chloride which enters coil 21 from line 14, already mentioned.

The following example is introduced to show results normally expected in the operation of the process although with no intention of unduly limiting the generally broad scope of the invention.

A butane fraction consisting of approximately 95% normal butane and 5% isobutane is heated in a coil to approximately 300° F. under a pressure of 200 pounds per square inch, thereafter commingled with 5% by weight of hydrogen chloride and with approximately 10% by weight of separately vaporized aluminum chloride and the resulting commingled mixture is directed to a reactor in which substantial isomerization occurs producing a mixture containing approximately 40% of isobutane and 60% normal butane. To the mixture of isobutane, normal butane, and catalyst so obtained by the primary isomerizing treatment is added a hydrocarbon fraction containing ethylene, propene, and butenes. The addition of olefinic hydrocarbons is controlled so that approximately 10 molecular proportions of isobutane are present per one molecular proportion of olefin added thereto to form a substantially saturated alkylate which is fractionated into an alkymer gasoline of approximately 93 octane number, a higher boiling substantially saturated hydrocarbon fraction, and unconverted butanes, the latter suitable for recycling to further isomerizing and alkylating treatments.

The character of the present invention and its novelty and utility in producing gasoline from normal butane and olefinic hydrocarbons can be seen from the preceding specification and example given, although neither section is intended to limit unduly its generally broad scope.

I claim as my invention:

1. A process for the production of more valuable products from normal paraffins and olefins which comprises vaporizing aluminum chloride, simultaneously heating the normal paraffin to a temperature below the sublimation temperature of the aluminum chloride but to a temperature sufficiently high to effect isomerization when the aluminum chloride and normal paraffin are combined, combining the normal paraffin with the aluminum chloride vapors whereby to condense the latter, isomerizing the normal paraffin to a branched-chain paraffin in the presence of the sublimed aluminum chloride, adding an olefin to the resulting mixture of conversion products and aluminum chloride and alkylating the branched-chain paraffin with said olefin.

2. A process for the production of more valuable products from normal butane and olefins which comprises vaporizing aluminum chloride, simultaneously heating the normal butane to a temperature below the sublimation temperature of the aluminum chloride but to a temperature sufficiently high to effect isomerization when the aluminum chloride and normal butane are combined, combining the normal butane with the aluminum chloride vapors whereby to condense the latter, isomerizing the normal butane to isobutane in the presence of the sublimed aluminum chloride, adding an olefin to the resulting mixture of conversion products and aluminum chloride and alkylating the isobutane with said olefin.

3. A process for the production of more valuable products from normal butane and butenes which comprises vaporizing aluminum chloride, simultaneously heating the normal butane to a temperature below the sublimation temperature of the aluminum chloride but to a temperature sufficiently high to effect isomerization when the aluminum chloride and normal butane are combined, combining the normal butane with the aluminum chloride vapors whereby to condense the latter, isomerizing the normal butane to isobutane in the presence of the sublimed aluminum chloride, adding butenes to the resulting mixture of conversion products and aluminum chloride and alkylating the isobutane with said butenes.

4. The process of claim 1 further characterized in that hydrogen chloride is added to the aluminum chloride vaporizing step.

5. The process of claim 2 further characterized in that said olefin comprises a normally liquid olefin.

6. The process of claim 2 further characterized in that said olefin comprises a normally gaseous olefin.

7. A process for the production of more valuable products from normal paraffins which comprises vaporizing aluminum chloride, simultaneously heating the normal paraffin to a temperature below the sublimation temperature of the aluminum chloride but to a temperature sufficiently high to effect isomerization when the aluminum chloride and normal paraffin are combined, combining the normal paraffin with the aluminum chloride vapors whereby to condense the latter, and isomerizing the normal paraffin to a branched-chain paraffin in the presence of the sublimed aluminum chloride.

GUSTAV EGLOFF.